United States Patent [19]

Evans et al.

[11] Patent Number: 5,924,728
[45] Date of Patent: Jul. 20, 1999

[54] FUEL BOTTLE ATTACHMENT IN FLUID FUELED INFLATOR

[75] Inventors: John O. Evans, Beaver Dam; Scott L. Gary, Wellsville; William R. Eckardt, South Ogden; Lester L. Valencia, Roy; Harry W. Miller, II, Ogden, all of Utah

[73] Assignee: Autoliv ASP, Inc., Ogden, Utah

[21] Appl. No.: 08/844,078

[22] Filed: Apr. 18, 1997

[51] Int. Cl.⁶ .................................................. B60R 21/26
[52] U.S. Cl. ............................................................. 280/741
[58] Field of Search .................................. 280/736, 737, 280/741

[56] References Cited

U.S. PATENT DOCUMENTS

| | | | |
|---|---|---|---|
| 3,930,666 | 1/1976 | Lynch et al. ...................... | 280/150 AB |
| 4,021,058 | 5/1977 | Suzuki et al. ............................. | 280/737 |
| 4,084,839 | 4/1978 | Takagi et al. ............................. | 280/736 |
| 4,370,930 | 2/1983 | Strasser et al. .......................... | 102/530 |
| 4,394,033 | 7/1983 | Goetz et al. .............................. | 280/736 |
| 5,060,973 | 10/1991 | Giovanetti .............................. | 280/736 |
| 5,330,730 | 7/1994 | Brede et al. ............................ | 422/305 |
| 5,350,192 | 9/1994 | Blumenthal ............................. | 280/737 |
| 5,356,176 | 10/1994 | Wells ...................................... | 280/737 |
| 5,388,858 | 2/1995 | Cuevas .................................. | 280/728 A |
| 5,454,593 | 10/1995 | Armstrong et al. .................... | 280/741 |
| 5,464,247 | 11/1995 | Rizzi et al. ............................. | 280/737 |
| 5,470,104 | 11/1995 | Smith et al. ............................. | 280/737 |
| 5,487,561 | 1/1996 | Mandzy et al. ......................... | 280/741 |
| 5,494,312 | 2/1996 | Rink ........................................ | 280/737 |
| 5,503,426 | 4/1996 | Lang et al. ............................ | 280/728.2 |
| 5,529,333 | 6/1996 | Rizzi et al. ............................. | 280/737 |
| 5,531,473 | 7/1996 | Rink et al. ............................... | 280/737 |
| 5,542,702 | 8/1996 | Green et al. ............................ | 280/737 |
| 5,582,428 | 12/1996 | Buchanan et al. ...................... | 280/741 |

*Primary Examiner*—Kenneth R. Rice
*Attorney, Agent, or Firm*—Sally J. Brown

[57] ABSTRACT

An improved inflator featuring a more reliable and more readily assembled reservoir is described. The reservoir features an interlocking channel lock connection with an adapter which is separately attached to the inflator housing. The reservoir is particularly intended for storing liquid fuels, but is applicable to a variety of fluids.

17 Claims, 4 Drawing Sheets

FUEL BOTTLE ATTACHMENT IN FLUID FUELED INFLATOR

BACKGROUND OF THE INVENTION

1. Field of the invention

The present invention is directed to an inflator, or gas generator, which is suitable for use with vehicle airbag passive restraint systems. More particularly, this invention is directed to an improvement to inflators which generate gas, at least in part, by the reaction of a fluid fuel with an oxidizing agent.

2. Description of background and related art

Airbag passive restraint systems are now provided in virtually all of the automobiles presently being manufactured in this country. These systems rely on a crash sensing device initiating the operation of an inflator causing the rapid release or generation of a quantity of gas which rapidly inflates a cushion, or airbag, causing it to deploy to a position between a vehicle occupant and hard surfaces on the vehicle into which the occupant might otherwise be propelled. Various inflators have been used. Originally they relied on the rapid release of a quantity of a compressed gas. Later inflators relied on the rapid generation of gas by the reaction of solid gas generating materials, such as sodium azide, with an oxidizing agent to produce the inflation gas. So called hybrid inflators relied on the exothermic oxidizing reaction of solid gas generating materials to produce a generated gas and heat, which was then mixed with a compressed inert gas as it is released from storage heating it to an increased temperature whereby the mixed gas exhibits an enhanced volume/pressure relative to what it would have exhibited were its temperature not increased. Recently, a new type of inflator has been introduced which relies on the combustion of a fluid fuel to generate a volume of heated gas, which can be used as the inflation gas directly, or, similar to the hybrid inflators, can be used to mix with and heat a compressed inert gas as it is released to the airbag.

Several examples of the new fluid fuel inflators can be found in U.S. Pat. Nos. 5,060,973 to Giovanetti, 5,330,730 to Brede et al., 5,350,192 to Blumenthal, 5,470,104 to Smith et al., 5,487,561 to Mandzy et al., 5,494,312 to Rink, 5,529,333 to Rizzi et al. and 5,531,473 to Rink. Some of these new fluid fueled inflators store a mixture of the fluid fuel with an oxidizing gas, while others store the fluid fuel and oxidizing agent separately, only bringing them together when the inflator is activated. Some of the fluid fuel inflators provide the fuel as a liquid while others provide it as a gas.

The present invention relates to fluid fuel inflators wherein the fuel is stored as a liquid and is stored separate from the oxidizing agent. In such inflators, the liquid fuel is provided in a separate storage chamber. Typically such storage chambers have comprised a fuel bottle mounted to an adapter so as to be located adjacent to, or partially about, an initiator device such as a squib. Typically these components are assembled by, first, filling the bottle with the liquid fuel, separately assembling the initiator to the adapter, providing an O-ring, slipping the fuel bottle either over or into the adapter and applying a laser weld where the bottle adjoins the adapter. While these assemblies usually perform satisfactorily, we have found that occasionally the desired leak proof seal is not achieved, allowing fuel to leak out of the fuel bottle. We have also found that sometimes the fuel bottle separates from the adapter during airbag deployment. It is generally undesirable to permit any solid parts to be loose during the fuel combustion/gas generation operations which occur during deployment since such parts could become flying projectiles, and/or block or restrict orifices within the inflator causing erratic and possibly unsatisfactory performance by the assembly.

SUMMARY OF THE INVENTION

It is an object of the present invention to provide an inflator which eliminates, or minimizes, the above noted problems encountered in liquid fueled inflators.

A further object of the present invention is the provision of an inflator having enhanced reliability.

A further object is the provision of an inflator having an improved connection between the fuel bottle and the remainder of the inflator.

A still further object is the provision of an inflator which is easier to assemble.

DETAILED DESCRIPTION OF THE INVENTION

Figure 1:
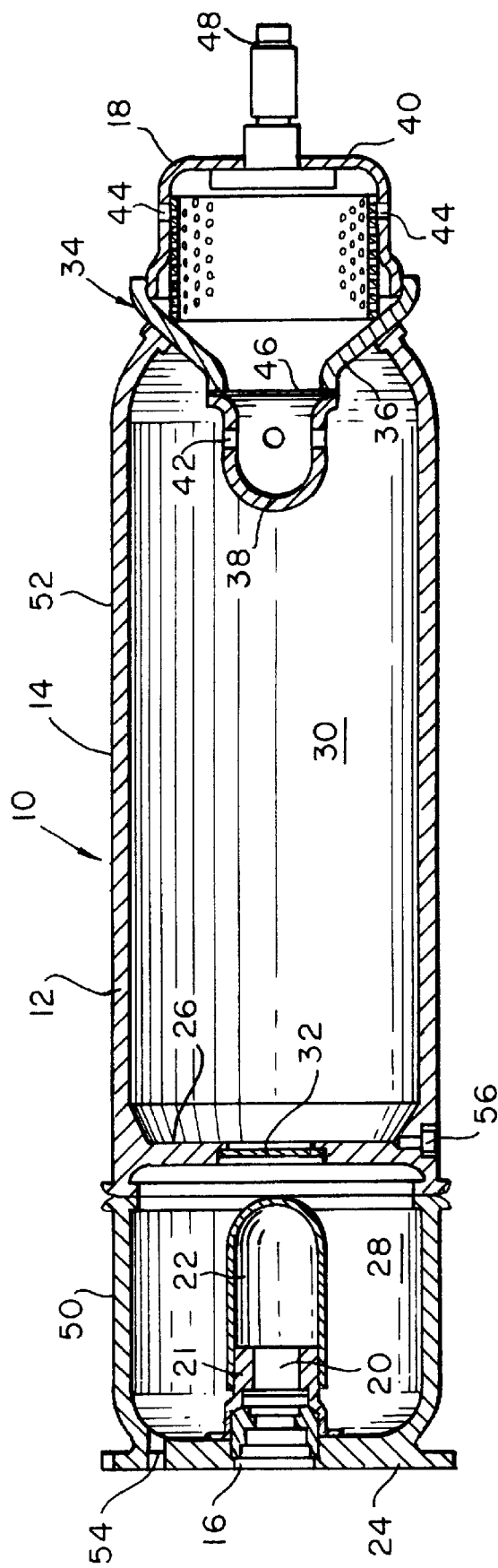
FIG. 1 is a sectional view of a prior art inflator.

A typical prior art inflator of the type to which the present invention pertains is illustrated in FIG. 1. The inflator 10 includes a housing 12 comprising a side wall 14 extending from a first end 16 to a second end 18. An assembly, which includes an igniter 20, an adapter 21 and a fuel bottle, or reservoir, 22, is mounted to the structure 24 closing the first end 16. A bulkhead 26 spans the interior of the housing dividing it into two chambers, a combustion chamber 28 and an auxiliary gas chamber 30. The bulkhead includes an opening means 32 which can be a rupture disc, a weakened portion of the bulkhead, or a similar structure. The side wall 14 is welded to a diffuser assembly 34 at the second end 18 of the inflator. The diffuser assembly includes a conical adapter 36 extending between an internal cap 38, located in the interior of the inflator's housing 12, and an external cap 40 facing away from the inflator housing. The internal cap 38 includes a first plurality of ports 42 which communicate with the auxiliary gas chamber 30. The external cap 40 includes a second plurality of ports 44 communicating with the exterior of the inflator. An openable means 46, such as a rupture disc, is provided between the two pluralities of ports. The external cap 40 also includes a mounting stud 48 provided to be used in mounting the inflator in an airbag assembly.

The inflator is fabricated by providing the side wall of the housing in two sections, a first, or combustion chamber, section 50 which extends to the first end 16 of the housing and a second, or auxiliary gas chamber, section 52 which extends to the second end 18 of the housing. The combustion chamber section 50, is assembled by attaching the adapter 21 to the end of section 24. Fuel is added to the fuel bottle 22 through its open end, which open end is then slipped over the adapter 21, and a weld applied where the bottle joins the adapter. The diffuser assembly 34, comprising the conical adapter 36, the internal cap 38 and the external cap 40, is assembled by welding the components together, and is then assembled and welded to the auxiliary gas chamber section 52. The combustion chamber section 50 and the auxiliary gas chamber section 52 are then welded together. An oxidizing gas is then added to the combustion chamber 28 through the fill port 54 and an auxiliary gas is added to the auxiliary gas chamber 30 through the fill port 56. An initiator 20, such as a squib, can then be mounted and fixed in the adapter 21 either by a screw or bayonet stud connection or by swaging a portion of the adapter over the inserted squib.

The present invention involves the design and attachment of the fuel reservoir 22 to the adapter and the attachment of the adapter 21 to the combustion chamber section 50.

Figure 2:
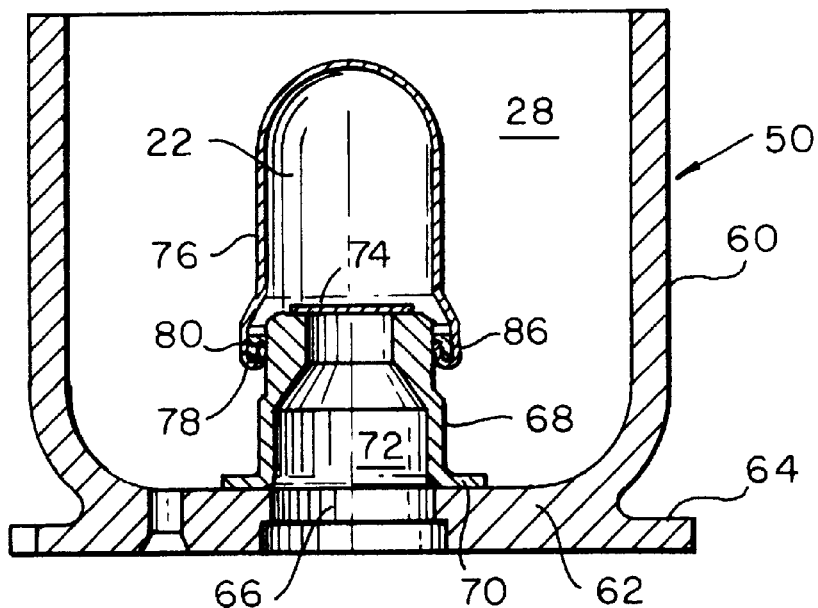
FIG. 2 is a sectional view of a combustion chamber section of an inflator according to the present invention.

FIG. 2 illustrates a fuel bottle 22 assembled to the combustion chamber section 50 of an inflator according to the present invention. The combustion chamber section 50 of the inflator housing includes a longitudinal wall portion 60 and an end structure portion 62 which includes an integral flange 64. An opening, or port 66, is provided through the center of the end structure, through which an initiator (not shown), such as an to electrically actuated squib, can be mounted. The combustion chamber section 50 partially defines the combustion chamber 28, which prior to activation of the inflator serves as a storage chamber containing a pressurized or compressed gas, typically an oxidizing gas. A generally cylindrical mating structure, or adapter 68, with an externally extending flange 70, is mounted adjacent the port 66 so that it extends into the combustion chamber 28. The adapter is mounted to the end structure 62 such that a cavity extending through its interior aligns with the port 66 and, therewith, defines a chamber 72 for receiving the igniter squib (not shown). An isolation structure, such as an isolation partition, or disc 74, is welded, or otherwise affixed, so as to extend over the interior end of the adapter 68 providing a fluid tight seal. The fuel reservoir structure, or bottle 22, has a throat, or joinder portion, which extends over a shaped portion at the interior end of the adapter 68 which is shaped to fit within the throat portion of the bottle. The bottle 22 is mounted to the adapter 68 by a pair of mating channel lock connectors 78, 80. 15 One channel lock connector, the female 78, is provided by an inward fold 79 of the rim at the open end of the fuel bottle, while the second channel lock connector, the male 80, is provided by providing a strip which protrudes from and extends around the adapter 68. The protruding strip of the connector 80 extends into the fold created by the folded rim of the connector 78. The channel lock connectors 78, 80 provide a positive, readily established fluid tight connection of the fuel bottle 76 to the adapter 68, and through it, to the remainder of the inflator assembly.

The combustion chamber section 50 is assembled by locating the adapter 68 adjacent the interior surface of the end structure 62 where it is coaxial with the port 66 extending through such structure and welding, by laser welding, the flange 70 to the adjacent surface of the end structure. A liquid fuel is then provided in the fuel bottle 76. The open end of the fuel bottle 76 is placed over the interior end of the adapter 68 and the bottle is advanced toward the end structure 62. As the bottle advances it first slides over the interior end of the adapter 68 and then the folded rim provided at the advancing end of the bottle slides over the male channel lock connector 80, or protruding strip, provided on the side of the adapter. The channel lock connectors are resilient and become slightly compressed as they slide past each other. When the connectors advance to a position where the ends of the connectors have passed over each other, they spring back to their original position. The fuel bottle 76 is then withdrawn. or retracted, away from the end structure 62, causing the connectors 78 and 80 to interlock with each other as the protruding strip is engaged in the fold formed by the folded rim, thereby limiting the distance the fuel bottle 76 can be withdrawn. Once the connectors are interlocked and the fuel bottle 76 has been retracted as far as it will go, the interlocked channel lock connectors 78 and 80 are compressed against the adapter 68 by a roll crimping or pressure crimping device, thereby forming impressed deformations in the interlocked connectors and assuring a rigid connection and a fluid tight seal. The assembly of the channel lock connection is relatively quick and reliable. The initial channel lock connection locates and holds the components in the proper position for the crimping operation.

The combustion chamber section 50 is then attached to the auxiliary gas chamber section 52 by an inertial weld and the remainder of the inflator assembled in the same manner as is the inflator illustrated in FIG. 1.

The folded rim comprising the female channel lock connector 78 provided at the open end of the fuel bottle 76, can be formed by go turning a portion of the wall of the throat of the fuel bottle adjacent its open end back into itself. As illustrated in FIGS. 2, 3A, 3B and 3C, the fuel bottle is dimensioned so that the inner side of its wall 82 adjacent ridge 83 contacts the outer wall 84 of the adapter 68 while the maximum dimension of a portion 86 of the fuel bottle wall adjacent to and inclusive of the channel lock connector 78 is preferably increased (over the maximum dimension of the major portion of the fuel bottle) by an amount substantially equivalent to the additional thickness required by the completed channel lock. This configuration provides additional rigidity by assuring at least two circumferential zones wherein the fuel bottle 76 is supported and reinforced by the adapter 68.

Figure 3A:
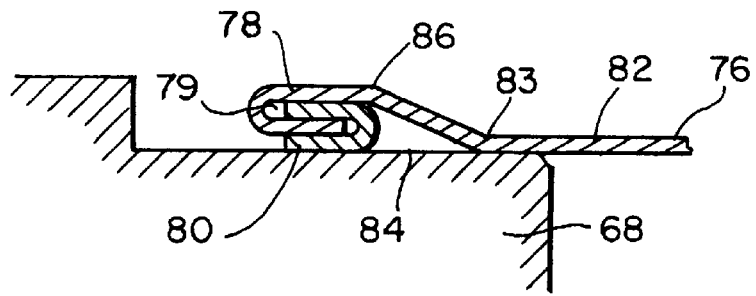
FIGS. 3A, 3B and 3C are sectional detail views of alternative channel lock connections according to the present invention.
Figure 3B:
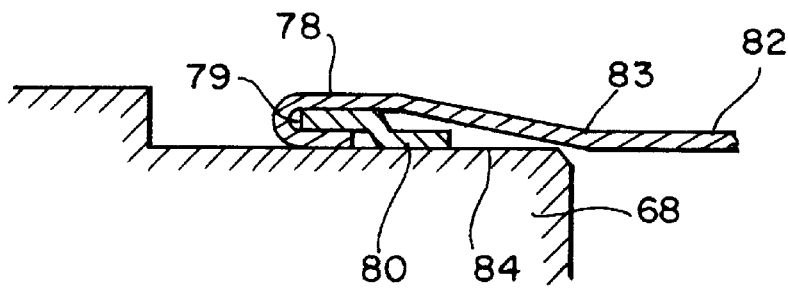
Figure 3C:
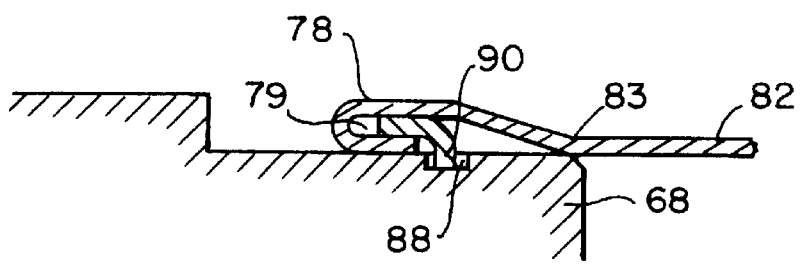

The male channel lock connector 80 provided around the external circumference of the adapter 68 can be assembled by forming a U-shaped strip of sheet metal in a circular, or ring, shape wherein its opposed rims are folded back to lie slightly separated and parallel to each other, as illustrated in FIG. 3A. Alternatively, the two rims can extend away from each other with one rim having a smaller diameter capable of providing a close mating relationship with the outer wall 84 of the adapter 68, as illustrated in FIG. 3B. The male channel lock connector 80, in the form of a ring of sheet material, is slid, or forced, over the interior end of the adapter 68 and attached thereto by a welding or a soldering technique. Alternatively, as illustrated in FIG. 3C, the male channel lock connector 80 could include an internally extending rib 90 which is resiliently deformed when it is forced over the interior end of the adapter, after which it springs back and locks into the circumferential groove 88 provided about the adapter 68.

Both the male and the female channel lock connectors are preferably formed from a metal, such as steel, having a thickness of 0.1 to 0.4 mm, and preferably of 0.1 to 0.2 mm.

Figure 4:
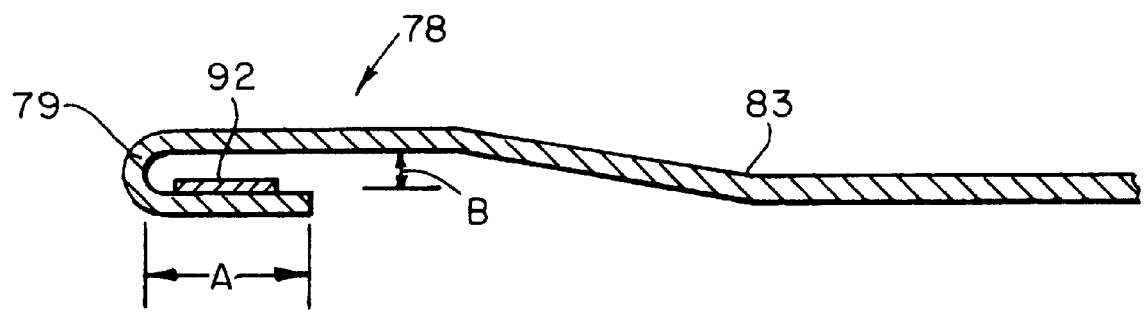
FIG. 4 is a detail view of a cross section a female channel lock connector according to the present invention.

As illustrated in FIG. 4, the folded lip of the female connector 78 extends a distance "A" from the fold 79. This distance typically is between 2 mm and 5 mm, and preferably is between 2 mm and 3 mm. The folded lip provides an opening into the fold having a width "B". This width typically is in the range of 0.5 mm to 2 mm, and , preferably, is in the range of 0.6 mm to 1 mm. An optional gasketing or sealing material 92 may be provided within the fold to enhance the consistent production of a fluid tight seal in the assembled inflator.

Figure 5:
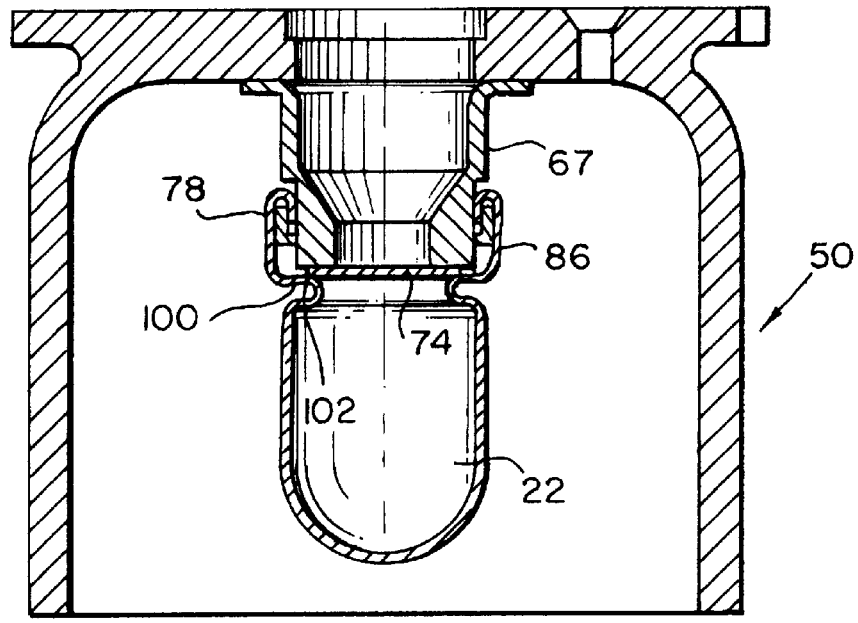
FIG. 5 is a sectional view of a further embodiment of the present invention.

An alternative fuel bottle configuration is illustrated in FIG. 5. The adapter 67 and male channel lock connector 80 used in this arrangement are essentially the same as the corresponding elements of the FIG. 2 embodiment. The fuel bottle 22 and associated female channel lock connector 78, as originally supplied for use in this arrangement, is similar to the fuel bottle and female connector of the prior embodiment. The fuel bottle 22, however, has a somewhat extended length, and the portion 86 of the bottle having an expanded maximum dimension, may extend further toward the closed end of the bottle. The principal difference of this embodiment is the circumferential ridge 100 placed in the fuel bottle after it has been filled and attached to the adapter 67 by the channel lock connectors. The circumferential ridge is a deformation of the fuel bottle wall produced by a roll crimping or pressure crimping operation which results in a portion of the deformed wall being held against the interior face 102 of the adapter 67 thereby further locking the fuel bottle and adapter in their relative positions. This configuration is particularly advantageous in that it provides alignment and sealing of the isolation structure 74 in a position providing a fluid tight seal between the fuel bottle 22 reservoir and the chamber 72 provided for the squib without the need for welding the isolation structure to either the adapter 67 or the bottle 22. The consistency and long term performance of the leak tight seal are enhanced when the maximum dimensions of the isolation disc 74 are at least equal to the corresponding dimensions of the adjacent interior face of the adapter 68.

Figure 6:
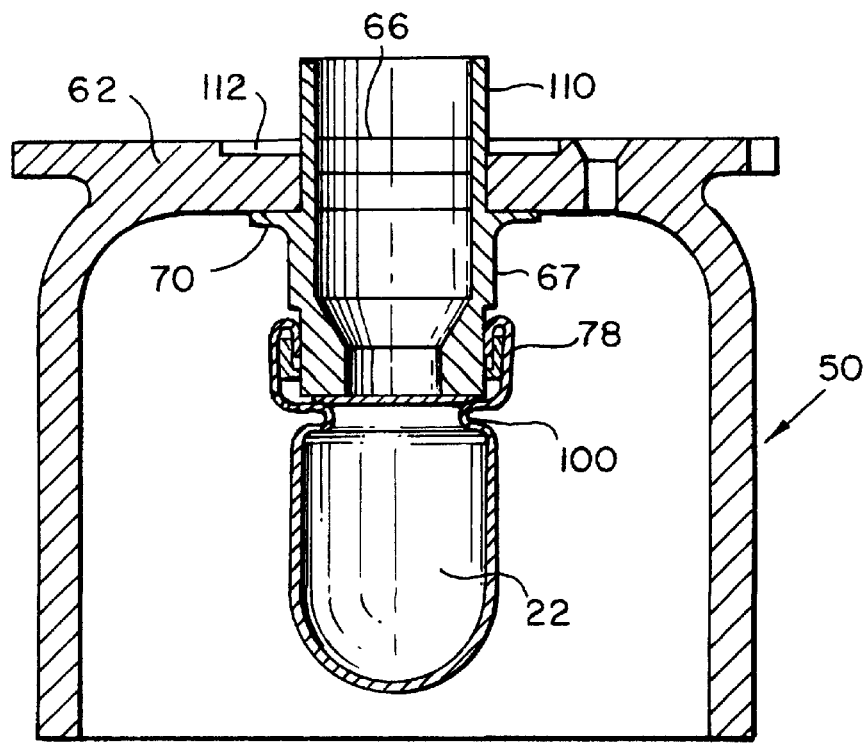
FIG. 6 is a sectional view of a still further embodiment of the present invention.

A further embodiment of an adapter for use with the present invention is illustrated in FIG. 6. In this embodiment, the fuel bottle 22, the connection formed by the channel lock connectors 78 and 80 and the circumferential crimp 100 are essentially the same as in the embodiment of FIG. 5. The distinctive feature of this embodiment is the cylindrical addition 110 to the cylindrical mating structure, or adapter 67, which extends through the port 66 in the end structure 62 of the combustion chamber section 50. This addition is designed to be inserted in the port 66 until the flange 70 lies flush against the internal surface of the end structure 62. At this position, the portion of the cylindrical addition 110 extending past the end structure 62 is rolled, or otherwise deformed, to lie directly against the exterior surface of the end structure 62, thereby locking the adapter in place. The planar nature of the exterior surface of the end structure 62 may be retained by recessing a portion 112 of the exterior surface of structure 62 sufficiently that it can receive the deformed portion of the cylindrical addition 110. The leak tightness of the assembly can be assured by either providing a laser weld where either the flange 70 or the swaged addition 110 abuts the end structure 62, or by providing a gasketing material, such as an O-ring, between the end structure 62 and an adjoining surface of the adapter 67.

The isolation structure 74 can be a thin metal or plastic sheet material. Its principal function is to contain the fuel in the reservoir, or bottle 22, and to protect the squib from degradation due to contact with the fuel. Accordingly, it may be attached either to the interior face of the adapter or to the interior of the bottle, as long as it is in position between the stored fuel and the squib when all of the components are assembled.

The isolation structure may be joined to the adapter or the reservoir with a fluid tight seal prior to the assembly of these components. However, as described in relation to the embodiment of FIG. 5, the fluid tight seal could result from the creation of the interiorly extending deformed ridge 100 in the wall of the reservoir. In any case, the consistency of achieving a fluid tight seal may be enhanced by providing a gasketing material between the isolation structure 74 and the adjoining interior face of the adapter 67.

The fluid provided in the reservoir preferably is a liquid or a liquefied gas since such is denser and, therefore, requires less storage volume. The fluid may be a fuel which is capable of being combusted when mixed with an oxidant, such as a hydrocarbon, an alcohol, or a hydrocarbon mixture such as gasoline or kerosene. The fluid may also be a liquid propellant, such as a mixture of hydroxylamine nitrate and triethanolamine nitrate (HAN/TEAN). The fluid could also be an exothermically decomposable material, such as nitrous oxide ($N_2O$), hydrazine or certain organic peroxides.

The fluid provided in the chamber 28 surrounding the reservoir, or bottle 22, can vary depending on what is provided in the bottle 22. When the bottle 22 contains a fuel, chamber 28 will contain an oxidant, such as an oxygen containing gas or nitrous oxide ($N_2O$), along with optional inert gas(es). When the bottle 22 contains a propellant or an exothermically decomposable material, the chamber 28 may contain a compressed inert gas, such as nitrogen, argon, helium, carbon dioxide, xenon or krypton.

It should be understood that the foregoing description is provided to advise workers how to make and practice the invention and is not intended to limit the scope of the covered invention. Many modifications to the described embodiment but within the scope of the invention should be apparent to workers in the art, for instance, the adapter and the reservoir could be assembled together before the adapter is assembled to the housing. The scope of the invention is defined by the following claims.

We claim:

1. In an inflator, comprising:
   (a) a first chamber containing a fluid,
   (b) a housing enclosing said first chamber,
   (c) a reservoir structure comprising a joinder portion and defining at least part of a second chamber,
   (d) a liquid in said second chamber, and
   (e) a mating structure attached to said housing, the improvement wherein:
      said joinder portion of said reservoir structure includes a folded rim which extends over a portion of said mating structure, and
      said mating structure includes a protruding strip which extends into the fold formed by said folded rim.
2. The inflator of claim 1 wherein:
   said folded rim extends a distance of 2 mm to 5 mm from said fold.
3. The inflator of claim 1 wherein:
   said folded rim and the portion of said protruding strip extending into said fold are joined by impressed deformations.
4. The inflator of claim 1 wherein:
   said mating structure includes a cavity extending therethrough, said cavity being adapted for mounting an initiator.
5. The inflator of claim 4, further comprising:
   an isolation partition located between the cavity in said mating structure and said second chamber in said reservoir structure.
6. The inflator of claim 5 wherein:
   said reservoir structure includes a ridge which is in proximity to the end of said mating structure which faces said second chamber.

7. The inflator of claim 6 wherein:

said isolation partition is located adjacent said end of said mating structure which faces said second chamber, and said isolation partition has at least one maximum dimension which is at least as large as the maximum dimension of the adjacent portion of said end of said mating structure.

8. The inflator of claim 7 wherein:

said ridge comprises a deformed portion of the wall of said reservoir structure which presses said isolation partition to said adjacent portion of said end of said mating surface.

9. The inflator of claim 1, wherein:

said mating structure extends through an opening in said housing to a deformed portion which holds said mating structure in said opening.

10. The inflator of claim 1, wherein:

said protruding strip comprises a ring of sheet metal attached to said mating structure by a weld.

11. The inflator of claim 1, wherein:

said protruding strip comprises a ring of strip material, and a portion of said ring extends into a groove provided on said mating structure.

12. The inflator of claim 1, further comprising a gasket material located in said fold formed by said folded rim.

13. The method of assembling an inflator, comprising:

providing a container having a neck portion extending to a folded rim, said folded rim defining an opening to the interior of said container, providing a mating structure which includes a shaped portion having a periphery which is shaped to fit within said opening in said container, said portion containing a protruding strip, adding a fluid to said container through said opening, advancing said container over said shaped portion until said folded rim passes said protruding strip, and withdrawing said container while causing said protruding strip to enter the fold formed by said folded rim.

14. The method of claim 13, further comprising:

compressing said neck portion causing sufficient deformation thereof to lock said protruding strip within said fold.

15. The method of claim 14, further comprising:

providing an isolation structure adjacent the end of said shaped portion of said mating structure, and deforming said container to provide a deformed portion which holds said isolation structure against said end.

16. The method of claim 13, wherein:

said fluid comprises a liquid fuel.

17. The method of claim 13, wherein:

said mating structure is assembled to an inflator housing prior to said step of advancing said container over said shaped portion.

* * * * *